(12) United States Patent
Jackson, III et al.

(10) Patent No.: US 12,312,281 B2
(45) Date of Patent: May 27, 2025

(54) ENVIRONMENTAL BARRIER COATING

(71) Applicant: Raytheon Technologies Corporation, Farmington, CT (US)

(72) Inventors: Richard Wesley Jackson, III, Mystic, CT (US); Xia Tang, West Hartford, CT (US); James T. Beals, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 581 days.

(21) Appl. No.: 17/711,625

(22) Filed: Apr. 1, 2022

(65) Prior Publication Data
US 2023/0312428 A1 Oct. 5, 2023

(51) Int. Cl.
| | |
|---|---|
| C04B 41/87 | (2006.01) |
| C04B 35/48 | (2006.01) |
| C04B 35/622 | (2006.01) |
| C04B 41/00 | (2006.01) |
| C04B 41/50 | (2006.01) |
| C04B 41/52 | (2006.01) |
| C04B 41/89 | (2006.01) |

(52) U.S. Cl.
CPC .......... C04B 41/526 (2013.01); C04B 35/481 (2013.01); C04B 35/62222 (2013.01); C04B 41/009 (2013.01); C04B 41/5024 (2013.01); C04B 41/5042 (2013.01); C04B 41/522 (2013.01); C04B 41/87 (2013.01); C04B 41/89 (2013.01)

(58) Field of Classification Search
CPC ..... C04B 41/52; C04B 41/524; C04B 41/526; C04B 41/85; C04B 41/87; C04B 41/89; C04B 41/5024; C04B 41/5042; F05D 2230/90; F05D 2230/611; F05D 2230/6111; F01D 5/288; C23C 28/04; C23C 28/042; C23C 28/048; C23C 28/30; C23C 28/34; C23C 28/345; C23C 28/3455
See application file for complete search history.

(56) References Cited

U.S. PATENT DOCUMENTS

| | | |
|---|---|---|
| 6,733,908 B1 | 5/2004 | Lee et al. |
| 6,759,151 B1 | 7/2004 | Lee |
| (Continued) | | |

FOREIGN PATENT DOCUMENTS

| | | |
|---|---|---|
| EP | 3954806 | 2/2022 |

OTHER PUBLICATIONS

European Search Report for European Patent Application No. 23165693.5 dated Aug. 9, 2023.

*Primary Examiner* — Z. Jim Yang
(74) *Attorney, Agent, or Firm* — Carlson, Gaskey & Olds, P.C.

(57) ABSTRACT

A coating according to an exemplary embodiment of this disclosure, among other possible things includes a bond coat including gettering particles and diffusive particles dispersed in a matrix; a top coat disposed over the bond coat, the top coat includes metal silicate particles; and an intermediate layer between the bond coat and the top coat. The intermediate layer includes hafnium silicate particles and matrix. A concentration of metal silicate in the intermediate layer is less than a concentration of metal silicate in the top coat. An article is also disclosed.

20 Claims, 2 Drawing Sheets

(56) References Cited

U.S. PATENT DOCUMENTS

| | | | |
|---|---|---|---|
| 6,777,093 B1* | 8/2004 | Ojard | C04B 41/89 428/293.1 |
| 7,138,183 B2 | 11/2006 | Hisamatsu et al. | |
| 9,139,480 B2* | 9/2015 | Raybould | C04B 41/52 |
| 10,125,618 B2 | 11/2018 | Lee et al. | |
| 10,604,454 B1 | 3/2020 | Zhu et al. | |
| 10,731,237 B1* | 8/2020 | Zhu | C22C 16/00 |
| 2005/0003212 A1* | 1/2005 | Sun | C04B 41/52 428/446 |
| 2005/0249977 A1* | 11/2005 | Hisamatsu | C04B 41/89 428/701 |
| 2009/0130446 A1* | 5/2009 | Schmidt | C04B 41/5053 428/428 |
| 2016/0332922 A1* | 11/2016 | Tang | C23C 28/044 |
| 2018/0320270 A1* | 11/2018 | Nardi | C23C 28/3215 |
| 2019/0092701 A1* | 3/2019 | Gong | C04B 41/5035 |
| 2019/0119172 A1* | 4/2019 | Kurimura | F01D 25/24 |
| 2019/0323112 A1* | 10/2019 | Shim | C23C 28/36 |
| 2020/0024974 A1* | 1/2020 | Jackson | C04B 41/009 |
| 2020/0080430 A1 | 3/2020 | Schmidt et al. | |
| 2020/0331817 A1* | 10/2020 | Bianchi | C04B 41/5096 |
| 2021/0040003 A1* | 2/2021 | Smyth | F01D 5/288 |
| 2021/0054749 A1* | 2/2021 | Jackson | C04B 41/89 |
| 2021/0071537 A1* | 3/2021 | Tang | C04B 41/4584 |
| 2021/0189904 A1* | 6/2021 | Kracum | F01D 25/08 |
| 2021/0198160 A1* | 7/2021 | Shim | C04B 41/522 |
| 2021/0221749 A1 | 7/2021 | Golden et al. | |
| 2021/0246080 A1 | 8/2021 | Jackson et al. | |
| 2022/0024827 A1 | 1/2022 | Golden et al. | |
| 2022/0169551 A1* | 6/2022 | Saha | C04B 41/89 |
| 2023/0174788 A1* | 6/2023 | Sarrafi-Nour | F01D 5/288 106/286.1 |
| 2023/0192554 A1* | 6/2023 | Blair | C23C 16/0272 428/335 |
| 2023/0250032 A1* | 8/2023 | Setlur | C04B 41/009 501/126 |

* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

A coating according to an exemplary embodiment of this disclosure, among other possible things includes a bond coat including gettering particles and diffusive particles dispersed in a matrix; a top coat disposed over the bond coat, the top coat includes metal silicate particles; and an intermediate layer between the bond coat and the top coat. The intermediate layer includes hafnium silicate particles and matrix. A concentration of metal silicate in the intermediate layer is less than a concentration of metal silicate in the top coat.

In a further example of the foregoing, a concentration of matrix in the bond coat is greater than a concentration of matrix in the intermediate layer.

In a further example of any of the foregoing, a concentration of matrix in the intermediate layer is greater than a concentration of matrix in the top coat.

In a further example of any of the foregoing, a concentration of matrix in the top coat is less than about 10% by volume.

In a further example of any of the foregoing, a concentration of metal silicate in the top coat is greater than about 90% by volume.

In a further example of any of the foregoing, the bond coat has a concentration of metal silicate that is less than about 10% by volume.

In a further example of any of the foregoing, a concentration of metal silicate in the bond coat is less than a concentration of metal silicate in the intermediate layer.

In a further example of any of the foregoing, the coating also includes a hafnium dioxide overlayer disposed over the top coat.

In a further example of any of the foregoing, the coating also includes an inner bond coat, the inner bond coat including gettering particles dispersed in matrix.

In a further example of any of the foregoing, the inner bond coat has a concentration of matrix that is greater than a concentration of matrix in the bond coat.

In a further example of any of the foregoing, the inner bond coat has a concentration of metal silicate that is less than about 10% by volume.

In a further example of any of the foregoing, the inner bond coat is about half as thick as the bond coat.

In a further example of any of the foregoing, the metal silicate is hafnium silicate.

An article according to an exemplary embodiment of this disclosure, among other possible things includes a ceramic matrix composite substrate and a coating disposed over the ceramic matrix composite substrate. The coating includes a bond coat including gettering particles and diffusive particles dispersed in a matrix and a top coat disposed over the bond coat. The top coat includes metal silicate particles and an intermediate layer between the bond coat and the top coat. The intermediate layer includes hafnium silicate particles and matrix. A concentration of metal silicate in the intermediate layer is less than a concentration of metal silicate in the top coat.

In a further example of the foregoing, the article also includes a first diffusion zone between the bond coat and the intermediate layer. The first diffusion zone has a concentration of metal silicate that is between a concentration of metal silicate in the bond coat and a concentration of metal silicate in the intermediate layer, and a second diffusion zone between the intermediate layer and the top coat. The second diffusion zone has a concentration of metal silicate that is between the concentration of metal silicate in the intermediate layer and a concentration of metal silicate in the top coat.

In a further example of any of the foregoing, a concentration of metal silicate in the bond coat is less than about 10% by volume.

In a further example of any of the foregoing, a concentration of matrix in the top coat is less than about 10% by volume.

In a further example of any of the foregoing, the article also includes an inner bond coat, the inner bond coat including gettering particles dispersed in matrix.

In a further example of any of the foregoing, the article also includes a comprising a hafnium dioxide overlayer disposed over the top coat.

DETAILED DESCRIPTION

Figure 1:
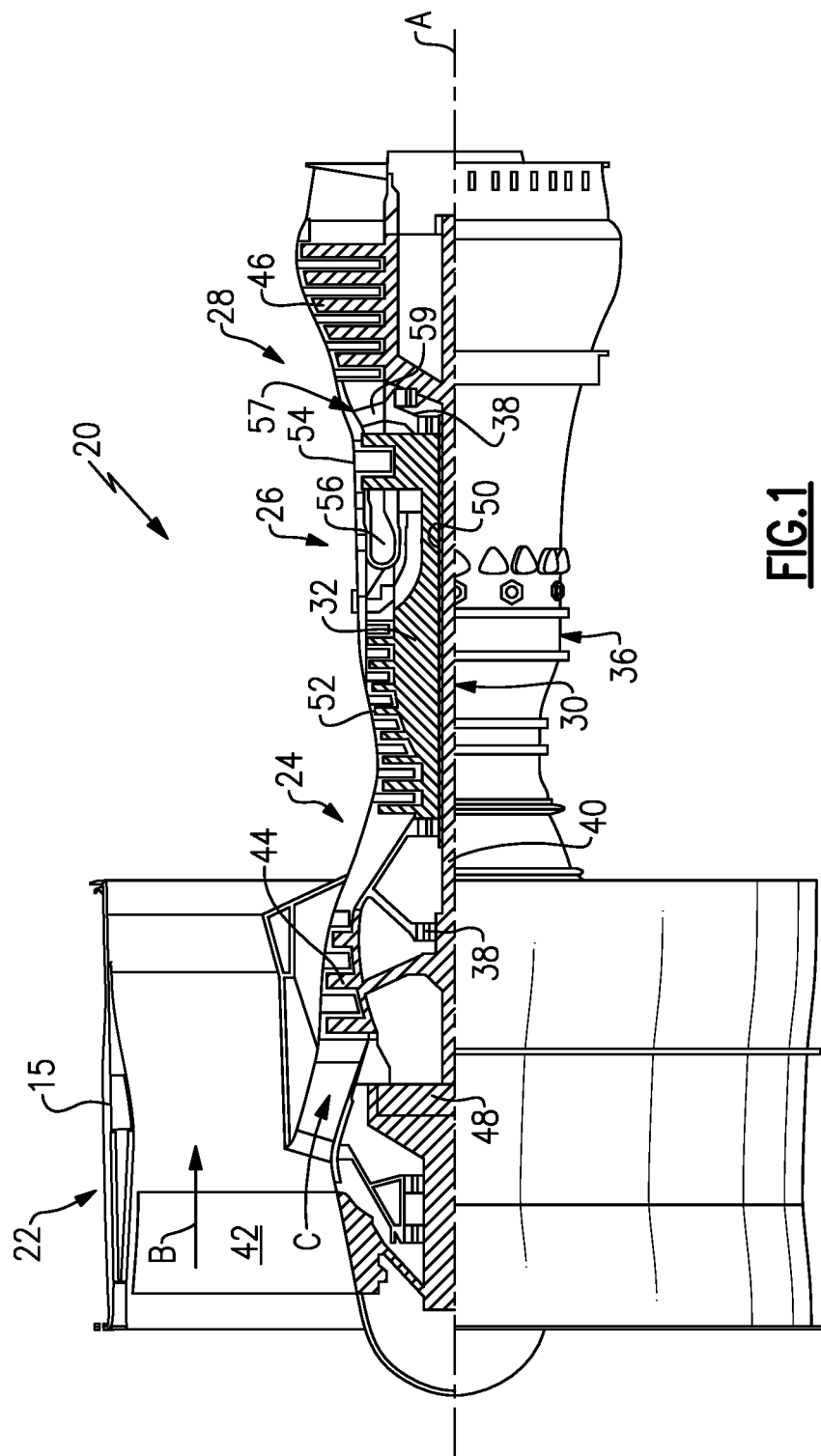
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
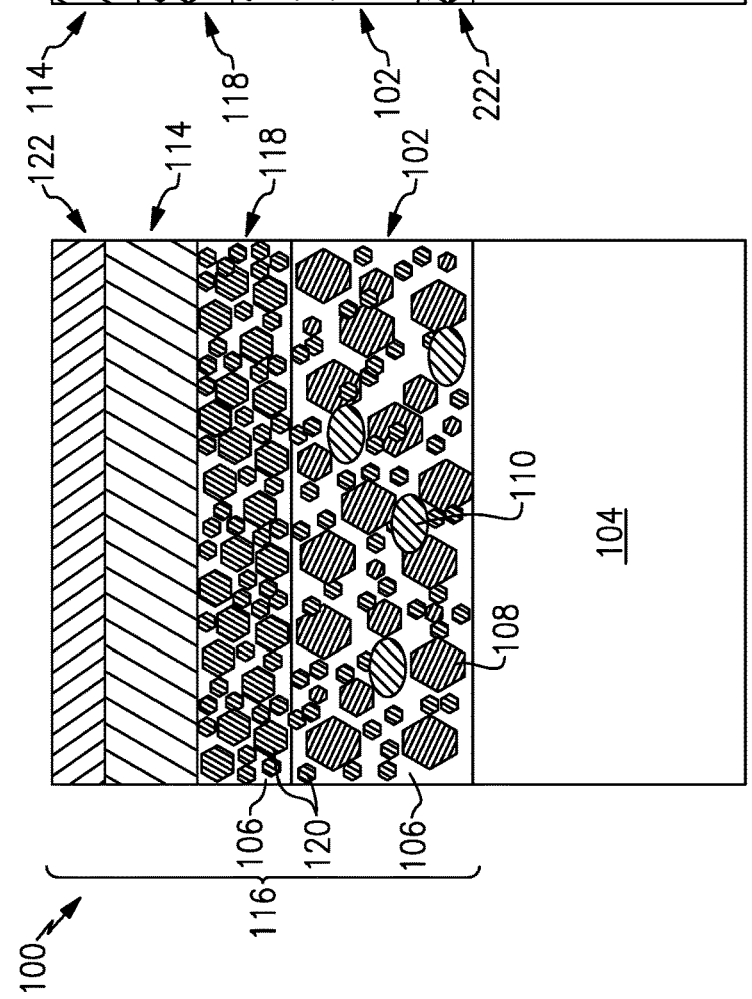
FIG. 2 illustrates an article for the gas turbine engine of FIG. 1 with a coating.

FIG. 2 schematically illustrates a representative portion of an example article 100 for the gas turbine engine 20 that includes a composite material bond coat 102 that acts as a barrier layer. The article 100 can be, for example, an airfoil such as a blade or vane in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or molybdenum disilicide ($MoSi_2$) particles 108, though other examples are contemplated. The gettering particles 108 could be, for instance, molybdenum disilicide particles, other silicides, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon carbide fibers in a silicon carbide matrix. The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles could reduce the likelihood of those oxidant species reaching and oxidizing the substrate 104.

A ceramic-based top coat 114 is interfaced with the bond coat 102. The top coat 114 includes a metal silicate such as hafnium silicate or yttrium silicate. The top coat 114 and bond coat 102 together form a barrier coating 116 for the substrate 104.

An intermediate layer 118 is provided in the coating 116 between the top coat 114 and the bond coat 102. The intermediate layer 118 comprises the matrix 106 and metal silicate particles 120.

The bond coat 102 also includes metal silicate particles 120. There is a concentration gradient of metal silicate increasing from the bond coat 102 to the top coat 114. Specifically, the top coat 114 is substantially all metal silicate, e.g., has a concentration C1 of metal silicate that is at least about 90% by volume. The intermediate layer 118 has a concentration C2 of metal silicate that is less than C1. The bond coat 102 has a concentration C3 of metal silicate that is less than C2. In one example, a ratio of the concentration C1 to the concentration C2 is between about 2.25 and about 1.2 and a ratio of the concentration C2 to the concentration C3 is between about 2 and about 1.2. In a particular example, C1 is about 90%, C2 ranges from about 40% to about 75%, and C3 ranges from about 20% and about 50%. In a more particular example, C1 is about 90%, C2 is about 75%, and C3 is about 50%. In another more particular example, C1 is about 90%, C2 is about 60%, and C3 is about 30%.

Conversely, the concentration of the matrix 106 material, increases from the bond coat 102 to the top coat 114. The top coat 114 has a concentration C1' of the matrix 106 that is less than about 10% by volume. The intermediate layer 118 has a concentration C2' of the matrix 106 that is greater than C1'. The bond coat 102 has a concentration C3' of the matrix 106 that is greater than C2'. In one example, C1' is between about 0 and about 10%, C2' is between about 10% and 40%, and C3' is between about 30% and about 50%.

When the coating 116 is formed, there may be distinct steps in concentrations C1/C2/C3 and C1'/C2'/C3' at the interfaces between the bond coat 102 and the intermediate layer 118 and the intermediate layer 118 and the top coat 114. However, during the lifetime of the article 100, the concentration gradient may become smoother due to diffusion of material between the bond coat 102, the intermediate layer 118, and the top coat 114. That is, there may develop diffusion zones between the bond coat 102 and the intermediate layer 118 and between the intermediate layer 118 and the top coat 114 that have intermediate concentrations of the metal silicate and the matrix 106.

The continuous distribution of the metal silicate throughout the coating 116 improves the mechanical strength of the coating. Coatings may be susceptible to delamination, cracking, or other mechanical defects at the interfaces of various layers within the coating (e.g., the interface between the bond coat 102 and the intermediate layer 118 and the interface between the intermediate layer 118 and the top coat 114. However, the metal silicate particles 120 form a continuous or semi-continuous matrix throughout the coating 116, which matrix extends through the interfaces. By forming this matrix, the interfaces are strengthened, and the opportunity for such defects to occur at interfaces is reduced.

The continuous distribution of matrix 106 throughout the coating 116 improves the effectiveness of the coating 116 in protecting the substrate 104 from environmental attack by decreasing the ability of oxidants to permeate through the coating 116. Typically, the matrix 106 serves as a mechanical barrier with respect to oxidants traveling within the coating 116. Moreover, the matrix 106 is concentrated near the substrate 104, where oxidation resistance is most important.

In one example, the bond coat 102 has a thickness that is about twice the thickness of the intermediate layer 118, and the intermediate layer 118 has a thickness that is about twice the thickness of the top coat 114.

The coating 116 may also include an optional overlayer 122 of hafnium dioxide disposed over the top coat 114. The hafnium dioxide improves the resistance of the coating 116 to vaporization due to reaction with water vapor in combustion gases of the gas turbine engine 20.

Figure 3:
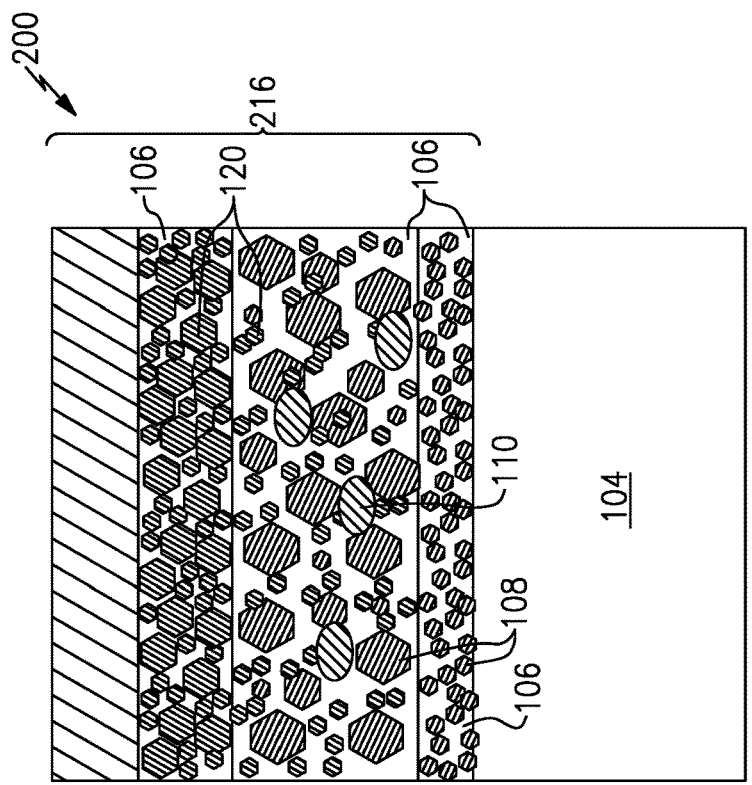
FIG. 3 illustrates another example article for the gas turbine engine with a coating.

FIG. 3 shows another example article with example coating 216. The example coating 216 is similar to the coating of FIG. 2, but includes an inner bond coat 222 between the bond coat 102 and the substrate 104. The inner bond coat includes gettering particles 108 disposed in the matrix 106. The inner bond coat is substantially free from the metal silicate particles 120, e.g., has a concentration C4 of metal silicate particles that is less than about 10% by volume. The inner bond coat 222 in some examples has the about same concentration of matrix 104 as the bond coat 102, and the balance gettering particles 108. The inner bond coat 222 provides an additional measure of oxidation resistance for the substrate 104.

In some examples, the inner bond coat 222 is about half as thick as the bond coat 102.

Though not shown in FIG. 3, it should be understood that the article 200 may also include the optional overlayer 122 of hafnium dioxide disposed over the top coat 114 discussed above.

The coating 116/216 can be applied to the example article by any known method, such as slurry based methods. For instance, a slurry containing bond coat 102 constituents can be applied to the article and then cured or otherwise set by any known method such as heat treatment. Similar slurry application and curing/setting methods can be repeated for intermediate layer 118. The top coat 114 can be applied by similar methods or other methods known in the art such as spray coating.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A coating, comprising:
a bond coat including gettering particles and diffusive particles dispersed in a matrix;
a top coat disposed over the bond coat, the top coat include metal silicate particles; and
an intermediate layer between the bond coat and the top coat, the intermediate layer including hafnium silicate particles and matrix, wherein a concentration of the hafnium silicate particles in the intermediate layer is less than a concentration of the metal silicate particles in the top coat.

2. The coating as recited in claim 1, wherein a concentration of matrix in the bond coat is greater than a concentration of matrix in the intermediate layer.

3. The coating as recited in claim 1, wherein a concentration of matrix in the intermediate layer is greater than a concentration of matrix in the top coat.

4. The coating as recited in claim 3, wherein a concentration of matrix in the top coat is less than about 10% by volume.

5. The coating as recited in claim 3, wherein a concentration of the metal silicate particles in the top coat is greater than about 90% by volume.

6. The coating as recited in claim 1, wherein a concentration of the metal silicate particles in the top coat is greater than about 90% by volume.

7. The coating as recited in claim 1, wherein the bond coat has a concentration of metal silicate that is less than about 10% by volume.

8. The coating as recited in claim 1, wherein a concentration of metal silicate in the bond coat is less than a concentration of metal silicate in the intermediate layer.

9. The coating as recited in claim 1, further comprising a hafnium dioxide overlayer disposed over the top coat.

10. The coating as recited in claim 1, further comprising an inner bond coat, the inner bond coat including gettering particles dispersed in matrix.

11. The coating as recited in claim 10, wherein the inner bond coat has a concentration of matrix that is greater than a concentration of matrix in the bond coat.

12. The coating as recited in claim 10, wherein the inner bond coat has a concentration of metal silicate that is less than about 10% by volume.

13. The coating as recited in claim 10, wherein the inner bond coat is about half as thick as the bond coat.

14. The coating as recited in claim 1, wherein the metal silicate particles in the top coat are hafnium silicate.

15. An article, comprising:
a ceramic matrix composite substrate; and
a coating disposed over the ceramic matrix composite substrate, the coating including
a bond coat including gettering particles and diffusive particles dispersed in a matrix;
a top coat disposed over the bond coat, the top coat include metal silicate particles and
an intermediate layer between the bond coat and the top coat, the intermediate layer including hafnium silicate particles and matrix, wherein a concentration of the hafnium silicate particles in the intermediate layer is less than a concentration of the metal silicate particles in the top coat.

16. The article of claim 15, further comprising a first diffusion zone between the bond coat and the intermediate layer, the first diffusion zone having a concentration of hafnium silicate particles that is between a concentration of metal silicate in the bond coat and a concentration of metal silicate in the intermediate layer, and a second diffusion zone between the intermediate layer and the top coat, the second diffusion zone having a concentration of metal silicate that is between the concentration of metal silicate in the intermediate layer and a concentration of metal silicate in the top coat.

17. The article of claim 15, wherein a concentration of metal silicate in the bond coat is less than about 10% by volume.

18. The article of claim 15, wherein a concentration of matrix in the top coat is less than about 10% by volume.

19. The article of claim 15, further comprising an inner bond coat, the inner bond coat including gettering particles dispersed in matrix.

20. The article of claim 15, further comprising a comprising a hafnium dioxide overlayer disposed over the top coat.

* * * * *